(12) United States Patent
Hall

(10) Patent No.: US 11,042,984 B2
(45) Date of Patent: Jun. 22, 2021

(54) SYSTEMS AND METHODS FOR PROVIDING IMAGE DEPTH INFORMATION

(71) Applicant: MOVEA, Grenoble (FR)

(72) Inventor: Daniela Hall, Eybens (FR)

(73) Assignee: Movea, Grenoble (FR)

( * ) Notice: Subject to any disclaimer, the term of this patent is extended or adjusted under 35 U.S.C. 154(b) by 600 days.

(21) Appl. No.: 15/348,098

(22) Filed: Nov. 10, 2016

(65) Prior Publication Data

US 2018/0130210 A1 May 10, 2018

(51) Int. Cl.
*G06T 7/11* (2017.01)
*H04N 5/232* (2006.01)

(52) U.S. Cl.
CPC ............ *G06T 7/11* (2017.01); *H04N 5/2328* (2013.01); *H04N 5/23258* (2013.01); *H04N 5/23267* (2013.01); *G06T 2207/10004* (2013.01)

(58) Field of Classification Search
CPC .......... H04N 5/23258; H04N 5/23267; H04N 5/2328; G06T 2207/10028; G06T 2207/10004; G06T 7/11; G06T 7/50
See application file for complete search history.

(56) References Cited

U.S. PATENT DOCUMENTS

| | | | | |
|---|---|---|---|---|
| 6,496,598 B1* | 12/2002 | Harman | ............... | H04N 13/144 382/154 |
| 6,999,612 B1* | 2/2006 | Oliensis | ................. | G06T 7/579 382/154 |
| 9,177,224 B1* | 11/2015 | Heller | .................. | G06K 9/4671 |
| 10,096,115 B2* | 10/2018 | Grandin | ............... | H04N 13/221 |
| 10,121,247 B2* | 11/2018 | Meier | .................... | H04N 7/185 |
| 10,147,211 B2* | 12/2018 | Holzer | ................. | H04N 13/111 |
| 2005/0088643 A1* | 4/2005 | Anderson | ............ | A01D 34/001 356/5.01 |
| 2012/0188235 A1* | 7/2012 | Wu | ........................ | G06T 7/11 345/419 |
| 2013/0064421 A1* | 3/2013 | Ahuja | ....................... | G06T 7/20 382/103 |
| 2013/0077852 A1* | 3/2013 | Chang | ..................... | G06T 7/593 382/154 |
| 2013/0308005 A1* | 11/2013 | Takahashi | ................. | G06T 7/60 348/222.1 |
| 2014/0037189 A1* | 2/2014 | Ziegler | ................... | G06T 17/00 382/154 |
| 2014/0307045 A1* | 10/2014 | Richardt | ............... | G06T 3/4038 348/36 |
| 2015/0003725 A1* | 1/2015 | Wan | ......................... | G06T 7/11 382/154 |
| 2015/0070523 A1* | 3/2015 | Chao | ................. | H04N 5/23293 348/218.1 |
| 2015/0110414 A1* | 4/2015 | Cho | ......................... | G06T 3/40 382/254 |

(Continued)

*Primary Examiner* — Shaghayegh Azima
(74) *Attorney, Agent, or Firm* — Bay Area Technology Law Group PC

(57) ABSTRACT

Systems and methods are disclosed for extracting depth information for an image by identifying a point of interest appearing in at least two images, calculating depth information for the point of interest by evaluating positions of the point of interest within the images with a change in position of the portable device, defining an image region based on a shared characteristic and assigning the depth information calculated for the point of interest to the defined region.

4 Claims, 6 Drawing Sheets

(56) References Cited

U.S. PATENT DOCUMENTS

| | | | | |
|---|---|---|---|---|
| 2015/0138322 A1* | 5/2015 | Kawamura | ............... | G06T 7/73 |
| | | | | 348/46 |
| 2015/0138380 A1* | 5/2015 | Tsubaki | ............. | H04N 5/23248 |
| | | | | 348/208.1 |
| 2015/0278599 A1* | 10/2015 | Zhang | ...................... | G06T 7/80 |
| | | | | 348/78 |
| 2015/0302635 A1* | 10/2015 | Siddique | ................ | G06T 15/04 |
| | | | | 345/426 |
| 2015/0312552 A1* | 10/2015 | Lu | .......................... | G06T 7/579 |
| | | | | 348/51 |
| 2016/0012643 A1* | 1/2016 | Kezele | ............... | G02B 27/0093 |
| | | | | 345/633 |
| 2016/0212411 A1* | 7/2016 | Lindner | ................... | G06T 5/50 |
| 2017/0018055 A1* | 1/2017 | Holzer | ................ | H04N 13/111 |
| 2017/0180644 A1* | 6/2017 | Alibay | ................... | H04N 5/145 |
| 2018/0054604 A1* | 2/2018 | Boyd | ..................... | B64D 47/08 |

* cited by examiner

SYSTEMS AND METHODS FOR PROVIDING IMAGE DEPTH INFORMATION

FIELD OF THE PRESENT DISCLOSURE

This disclosure generally relates to techniques for processing images captured by a portable device and more specifically to determining depth information for the images.

BACKGROUND

Advances in technology have enabled the introduction of portable devices that feature an ever increasing set of capabilities. Smartphones, for example, now offer sophisticated computing and sensing resources together with expanded communication functionality. Likewise, tablets, wearables, media players and other similar devices have shared in this progress. Notably, it is desirable and increasingly common to provide a portable device with digital imaging functions. Further, it may be desirable to apply various image processing techniques to obtain information about objects within the image such as depth information. Conventional techniques that have been developed to date suffer from various limitations. For example, methods relying on range finding typically involve projecting some type of radiation and calculating distance based on the travel time of a component reflected by an object. As will be appreciated, such systems require additional hardware and power. Other methods include the use of multiple lenses to enable a stereoscopic analysis. However, in addition to the requirement of additional optics, such techniques typically require that the lenses be spaced apart by a significant distance, complicating or practically preventing use in a compact, portable device. Accordingly, it would be desirable to provide depth information for images captured by a portable device that overcome these limitations. For example, it would be desirable to extract depth information using images captured from a single lens. Similarly, it would be desirable to provide such depth information without requiring range finding hardware. As will be described in the following materials, this disclosure satisfies these and other needs.

SUMMARY

As will be described in detail below, this disclosure includes a method for processing an image captured using a portable device to extract depth information. The method may involve capturing a first image with the portable device at a first time, capturing a second image with the portable device at a second time, determining a change in position of the portable device from sensor data from the first time to the second time, identifying a point of interest appearing in both the first image and the second image, calculating depth information for the point of interest by evaluating positions of the point of interest within the first image and the second image with the determined change in position of the portable device, defining a first region of one of the images having a shared image characteristic, wherein the point of interest is within the first region, and assigning depth information derived from the depth information calculated for the point of interest to points within the first region.

This disclosure also includes a portable device that may have a camera unit, a sensor for detecting motion of the portable device and a depth module. The depth module may identify a point of interest appearing in both a first image captured with the camera unit at a first time and a second image captured with the camera unit at a second time, calculate depth information for the point of interest by evaluating positions of the point of interest within the first image and the second image with a change in position of the portable device from the first time to the second time determined from data of the sensor, define a first region of one of the images having a shared image characteristic, wherein the point of interest is within the first region and assign depth information derived from the depth information calculated for the point of interest to points within the first region.

Further, this disclosure includes an image processing unit having a processor that receives a first image captured by a camera at a first time, receives a second image captured by the camera at a second time and obtains motion sensor data representing motion of the camera. The processor may implement a depth module to identify a point of interest appearing in both the first image and the second image, calculate depth information for the point of interest by evaluating positions of the point of interest within the first image and the second image with a change in position of the camera from the first time to the second time determined from the obtained motion sensor data, define a first region of one of the images having a shared image characteristic, wherein the point of interest is within the first region and assign depth information derived from the depth information calculated for the point of interest to points within the first region.

DETAILED DESCRIPTION

Figure 1:
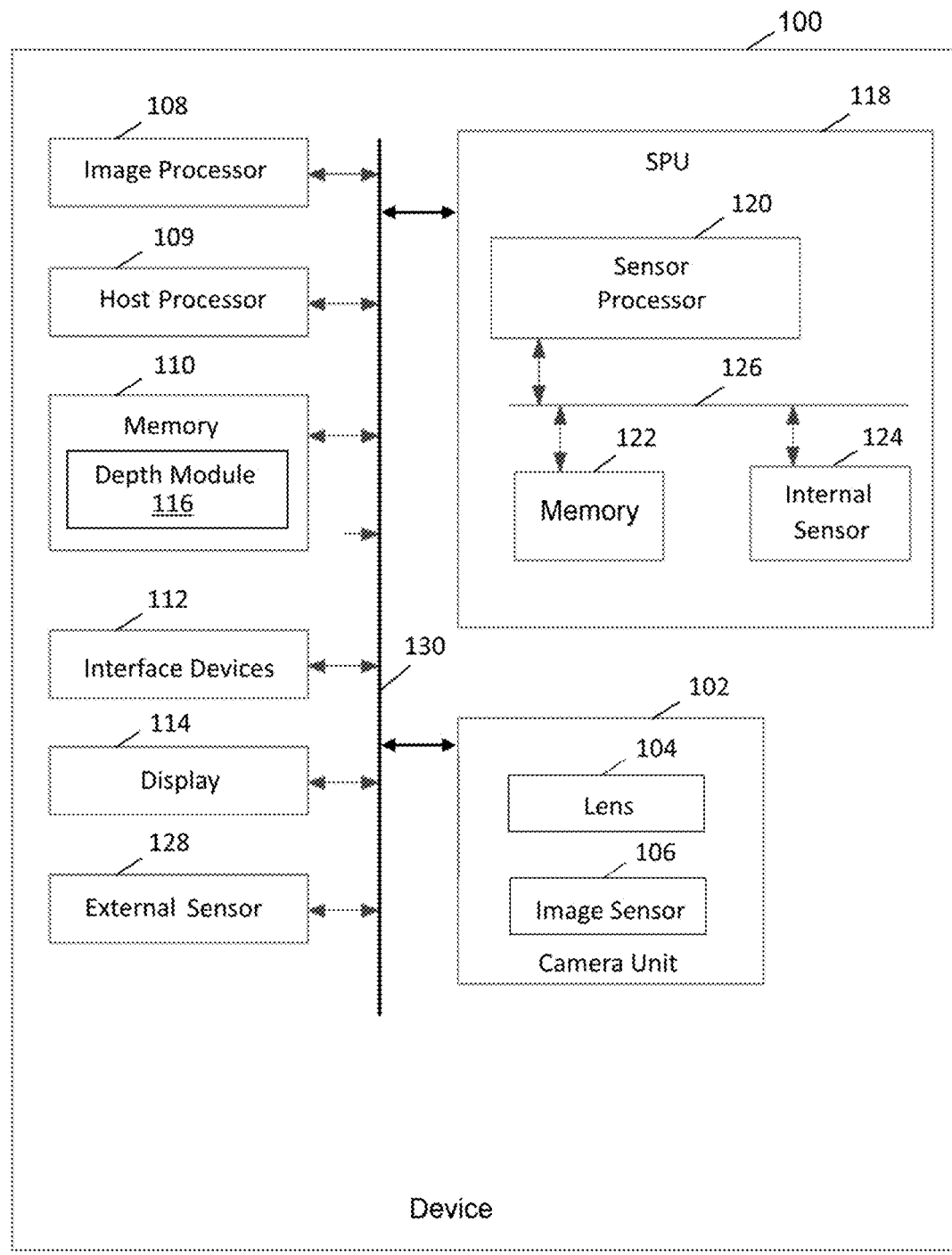
FIG. 1 is a schematic diagram of a device for providing depth information for a digital image according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "evaluating," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

As noted above, it is increasingly desirable to provide a portable electronic device with one or more digital cameras. This disclosure provides systems and methods for processing images captured by the portable device to extract depth information for the images.

To help illustrate these and other aspects of the disclosure, details regarding one embodiment of a portable electronic device 100 are depicted as high level schematic blocks in FIG. 1. As will be appreciated, device 100 may be implemented as a device or apparatus, such as a handheld device that can be moved in space by a user and its motion and/or orientation in space therefore sensed. For example, such a handheld device may be a portable phone (e.g., cellular phone, a phone running on a local network, or any other telephone handset), wired telephone (e.g., a phone attached by a wire), personal digital assistant (PDA), video game player, video game controller, (head-mounted) virtual or augmented reality device, navigation device, activity or fitness tracker device (e.g., bracelet or clip), smart watch, other wearable device, portable internet device (MID), personal navigation device (PND), digital still camera, digital video camera, binoculars, telephoto lens, portable music, video, or media player, remote control, or other handheld device, or a combination of one or more of these devices.

Device 100 includes a camera unit 102 configured for capturing images. The camera unit 102 includes at least an optical element, such as, for example, a lens 104, which projects the image onto an image sensor 106. Device 100 may also include an image processor 108, host processor 109, memory 110, interface device 112 and display 114. Image processor 108 and host processor 109 can be one or more microprocessors, central processing units (CPUs), or other processors which run software programs, which may be stored in memory 110, including depth module 116 that may include instruction for performing the operations described in this disclosure for extracting depth information for images captured with camera unit 102. In this embodiment, image processor 108 may be dedicated to imaging tasks while host processor 109 may perform other tasks associated with the operation of device 100. In other embodiments, a single processor may function as both the host processor and the image processor. In general, any suitable allocation of operations may be distributed among the processing resources of device 100. Interface device 112 can be any of a variety of different devices providing input and/or output to a user, such as audio speakers, buttons, touch screen, joystick, slider, knob, printer, scanner, computer network I/O device, other connected peripherals and the like. Display 114 may be configured to output images viewable by the user and may function as a viewfinder for camera unit 102.

Accordingly, multiple layers of software can be provided in memory 110, which may be any combination of computer readable medium such as electronic memory or other storage medium such as hard disk, optical disk, etc., for use with the image processor 108, host processor 109, or with other processing resources as noted. For example, an operating system layer can be provided for device 100 to control and manage system resources in real time, enable functions of application software and other layers, and interface application programs with other software and functions of device 100. Similarly, different software application programs such as menu navigation software, games, camera function control, image processing or adjusting, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 may include a general purpose sensor assembly in the form of integrated sensor processing unit (SPU) 118 featuring sensor processor 120, memory 122 and internal sensor 124, that may communicate over sensor bus 126. Memory 122 may store algorithms, routines or other instructions for processing data output by internal sensor 124 and/or other sensors as described below using logic or controllers of sensor processor 120, as well as storing raw data and/or motion data output by internal sensor 124 or other sensors. Internal sensor 124 may be one or more sensors for measuring motion of device 100 in space. In embodiments where internal sensor 124 is a motion sensor SPU 118 may also be referred to as Motion Processing Unit (MPU). Depending on the configuration, SPU 118 measures one or more axes of rotation and/or one or more axes of acceleration of the device. In one embodiment, at least some of the motion sensors are inertial sensors, such as rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, the gyroscopes and accelerometers may each have 3 orthogonal axes, such as to measure the motion of the device with 6 degrees of freedom. The signals from the sensors may be combined in a sensor fusion operation performed by sensor processor 120 or other processing resources of device 100 provides a six axis determination of motion. The sensor information may be converted, for example, into an orientation, a change of orientation, a speed of motion, or a change in the speed of motion. The information may be deduced for one or more predefined axes, depending on the requirements of the system. As desired, internal sensor 124 may be implemented using MEMS to be integrated with SPU 118 in a single package. Exemplary details regarding suitable configurations of image processor 108 and SPU 118 may be found in co-pending, commonly owned U.S. patent application Ser. No. 11/774,488, filed Jul. 6, 2007, and Ser. No. 12/106,921, filed Apr. 21, 2008, which are hereby incorporated by reference in their entirety. Further, SPU 118 may be configured as a sensor hub by aggregating sensor data from additional processing layers as described in co-pending, commonly owned U.S. patent application Ser. No. 14/480,364, filed Sep. 8, 2014, which is also hereby incorporated by reference in its entirety. Suitable implementations for SPU 118 in device 100 are available from InvenSense, Inc. of San Jose, Calif. Thus, SPU 118 may be configured to provide motion data for purposes independent of camera unit 102, such as for user interface functions, navigation purposes or others. Any, or all parts of the SPU may be combined with image processor 108 into a single chip or single package, and may be integrated into the camera unit 102.

Device 100 may also include other sensors as desired, including any number of sensors configured as internal sensors of SPU 118. Alternatively, or in addition, one or more sensors may be configured as external sensor 128, with resulting data output communicated over bus 130, described below, to image processor 108, sensor processor 120 or other processing resources in device 100. As used herein, "external" means a sensor that is not integrated with the SPU. Any combination of internal and external sensors may provide sensor data about the environment surrounding device 100. For example, sensors such as one or more pressure sensors, magnetometers, temperature sensors, infrared sensors, ultrasonic sensors, radio frequency sensors, position sensors such as GPS, or other types of sensors can be provided. In one embodiment, data from a magnetometer measuring along three orthogonal axes may be fused with gyroscope and accelerometer data to provide a nine axis determination of motion. Further, a pressure sensor may be used as an indication of altitude for device 100, such that a sensor fusion operation may provide a ten axis determination of motion. Device 100 may also receive sensor data from other devices that may be associated with the user. For example, device 100 may be implemented as a smartphone and may receive data from a device having sensing capabilities worn by the user, such as an activity bracelet, watch or glasses via any suitable wired or wireless connection.

In the embodiment shown, camera unit 102, SPU 118, image processor 108, memory 110 and other components of device 100 may be coupled through bus 130 and sensor processor 120, memory 1222 and internal sensor 124 may be couple through sensor bus 126, both of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between image processor 108 and memory 110.

As noted above, multiple layers of software may be employed as desired and stored in any combination of memory 110, memory 122, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between image processor 108 and SPU 118, for example, to transmit desired sensor processing tasks. Other embodiments may feature any desired division of processing between SPU 118 and image processor 108 as appropriate for the applications and/or hardware being employed. For example, lower level software layers may be provided in SPU 118 and an API layer implemented by image processor 108 may allow communication of the states of application programs as well as sensor commands. Some embodiments of API implementations in a motion detecting device are described in co-pending U.S. patent application Ser. No. 12/106,921, incorporated by reference above. In particular, device 100 may include depth module 116 as noted above for extracting depth information for captured images, and may comprise instructions stored in a suitable location, such as memory 110 as shown, that may be executed by image processor 108. In other embodiments, the instructions may be stored in any storage resource(s) and similarly may be executed by any processing resource(s), such as e.g. (in part) by sensor processor 120. Further, it should be appreciated that depth module 116 may be implemented using any suitable architecture and may be any combination of software, firmware or hardware.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an SPU may incorporate the sensor. The sensor or sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments the first substrate may be disposed laterally and electrically connected to the second substrate in a single semiconductor package.

As one example, the first substrate may be attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Depending on the context, motion data may refer to processed raw data, which may involve applying a sensor fusion algorithm or applying any other algorithm. In the case of a sensor fusion algorithm, data from one or more sensors may be combined to provide an orientation or orientation change of the device. In the described embodiments, an SPU may include processors, memory, control logic and sensors among structures.

As noted above, image(s) captured by camera unit 102 may be analyzed, such as by image processor 108 that performs the instructions of depth module 116 to extract depth information. An exemplary routine for depth information extraction is represented by the flow chart depicted in FIG. 2. Beginning with 200, portable device 100 may capture a first image and in 202, at least a second image may be captured. Sensor data, such as that obtained from internal sensor 124 and/or external sensor 128, may be processed in 204 to determine a change in position of portable device 100 between the times the first and second images were captured. As used herein, "a change in position" is meant to refer to a change in the (three-dimensional) location of portable device 100, a change in the orientation of portable device 100, such as a change in the angle at which lens 104 is directed, or any combination of the two. Next, in 206, a point of interest that appears in both the first and second image may be identified. Depth information for the point of interest may be calculated by evaluating positions of the point of interest within the first image and the second image with the determined change in position of the portable device in 208. A first region having a shared image characteristic may be defined in 210 for one of the images that includes the point of interest. Correspondingly, the depth information determined for the point of interest may be assigned to the first region in 212.

For example, the first and second images of 200 and 202 may be captured with camera unit 102. Relevant parameters associated with the images may be recorded, including exposure time, pixel size and focal length, as well as other aspects such as the time stamps. Sensor data reflecting motion of portable device 100 may also be obtained as indicated in 204. In one aspect, the sensor data may cover the period during which the first and second images are captured so that a change in position and/or orientation of portable device 100 may be determined. Depending on the embodiment, the sensor data may be output by internal sensor 124, external sensor 128, or any combination of the two. In one embodiment, the sensor data may include inertial sensor data from a gyroscope and an accelerometer. The sensor data may be provided at a sufficient sample rate, such as a rate that is equal to or a higher frequency than the rate at which the first and second images are captured to help ensure the sensor data accurately reflects the motion and position of portable device 100 at the moment of image capture. In particular, it may be noted that when portable device 100 is hand held, the images will not be captured identical positions, resulting in some change of perspective regarding the objects within the scenes of the images. Depending on the architecture of portable device 100, the processing of the sensor data may be performed by image processor 108, by sensor processor 120, or by any combination of these or other processing resources. By appropriately correlating the time stamps of the images with the sensor data, the position and orientation of portable device 100 may be determined at the moments when the images were captured.

One or more suitable points of interest may be identified that are common to the first and second images as indicated by 206. As will be appreciated, a number of algorithms have been developed in the computer vision field for the purpose of identifying such points. Examples of suitable algorithms include those based on the Harris affine detector, the Features from Accelerated Segment Test (FAST) detector, the Smallest Univalue Segment Assimilating Nucleus (SUSAN) detector, the Canny detector, the Sobel detector, and others, which may be used to detect features such as corners, edges and blobs. A point correspondence may be established when the same point of interest is identified in the first and second images. An example of a suitable algorithm for determining point correspondences is random sample consensus (RANSAC).

Figure 3:
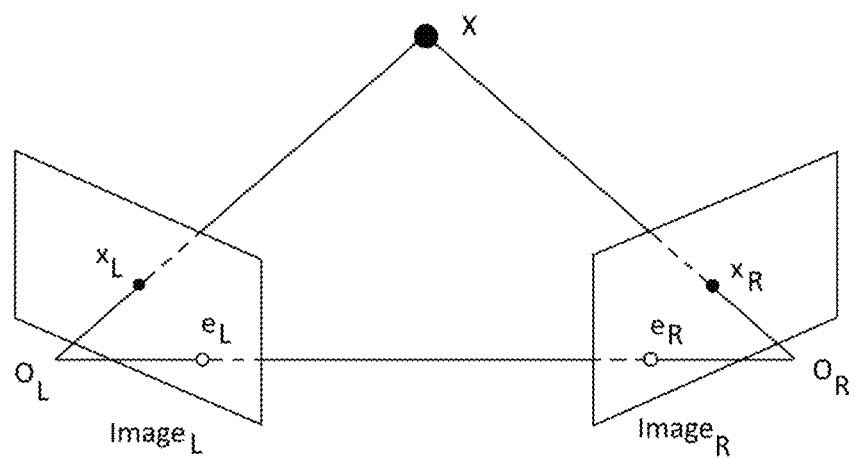
FIG. 3 is a schematic diagram depicting evaluating positions of a point of interest within two image according to an embodiment.

A determination of the three dimensional (3D) position of each common point of interest can be performed using any suitable technique. In one embodiment, the position may be calculated by evaluating positions of the point of interest within the first image and the second image and using the determined change in orientation of portable device 100. To help illustrate these aspects of the disclosure, FIG. 3 schematically depicts the 3D position of a point of interest X. A first image is designated $Image_L$, with the camera center indicated as $O_L$ and the two dimensional (2D) position of X indicated on the image as $x_L$. Similarly, the second image is designated $Image_R$, with the camera center $O_R$ and 2D position $x_R$. The relationship between the 2D point x and the 3D point X may be given by Equation (1), wherein P is a 3×4 3D to 2D projection matrix with homogeneous coordinates:

$$x = PX \tag{1}$$

Correspondingly, P may be given as Equation (2), wherein K are the intrinsic parameters of camera unit 102, including e.g. focal length and pixel size, R is the 3D rotation matrix representing the orientation of portable device 100 and t is the 3D translation representing the position of portable device 100:

$$P = K[R|t] \tag{2}$$

An example of 3D to 2D projection matrix P is shown in Equation (3):

$$\begin{bmatrix} su \\ sv \\ s \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} X \\ Y \\ Z \\ 1 \end{bmatrix} \tag{3}$$

In Equation (3), X, Y, and Z are the 3D world coordinates of point X, and u and v are the 2D coordinates in the image plane. The scale factor s depends on the intrinsic camera parameters K.

A fundamental matrix F, relates the 2D corresponding points between the two images as indicated in Equation (4):

$$x_R^T F x_L = 0 \tag{4}$$

When considering the left origin $O_L$ the origin of the world, the relationship between the respective projection matrices for the first and second images, $P_L$ and $P_R$, and the fundamental matrix F is shown in Equation (5), wherein $I_d$ is the 3D identity matrix, $e_L$ is the left epipole representing the projection or the 2D position of the right camera center $O_R$ in the left image plane $Image_L$, $e_R$ is the right epipole representing the projection or 2D position of the left camera center $O_L$ in the right image plane $Image_R$, and $[.]_x$ is the skew symmetric matrix operator:

$$P_L = [I_d|0], P_R = [[e_L]_x F|e_L] \tag{5}$$

In a simplified case where there is only a translational change in position between the two images, the solution for fundamental matrix F is simplified and requires much less computations as indicated in Equation (6), with the beneficial effect of intrinsic parameters for camera unit 102 cancelling:

$$F=[e_R]_x KK^{-1}=[e_R]_x \qquad (6)$$

As will be described below, sensor data from a gyroscope may be used to apply a rotational correction by homography to one of the images to simulate translation only conditions, allowing use of Equation (6) together with the projection matrix $P_R$ to solve for 3D point X, as will be shown below with reference to Equations (17) and (18).

In one exemplary illustration of these techniques, the first and second images, $I_{i0}$ and $I_{i1}$, may be captured at time instants i0 and i1, respectively, with portable device 100 in different positions. For example, the first and second image may be the left and right image of FIG. 3. As such, images $I_{i0}$ and $I_{i1}$ may be considered to be formed by applying the projection matrices $P_{i0}$ and $P_{i1}$ to the 3D objects within each image. By considering the origin of the first image to be the origin of the world, Equations (7) and (8) may be defined as follows, based on Equation (2), wherein $I_d$ is the 3D identity matrix:

$$P_{i0}=K[I_d|0] \qquad (7)$$

$$P_{i1}=K[R_{i0\rightarrow i1}|t_{i0\rightarrow i1}] \qquad (8)$$

According to the techniques of this disclosure, the rotation $R_{i0\rightarrow i1}$ between two images acquired successively by camera unit 102, given a change in position of portable device 100, may be derived from the gyroscope sensor data. For example, the gyroscope data may be integrated from the time of capture of the first image to the time of capture of the second image in order to obtain a change in orientation angle. In other words, the rotation angle is determined from gyroscope integration over the time span from the first image to the second image. Although some error in the gyroscope data may exist, it is expected that the error is sufficiently small to apply these techniques. Further, an iterative process may be performed to cause the solution to converge and reduce the error effect. Sensor fusion techniques combining gyroscope data and accelerometer data may also be used to determine the change in orientation from the first image to the second image. The change in orientation may be computed using any suitable technique (e.g. quaternions, Euler angles), and in any suitable reference frame, and may then be converted to a rotation matrix for use in Equation (8).

An isomorphism of the projections of the objects in the images, or homography, may be computed to compensate for the determined rotation based on the sensors of portable device 100. These aspects are known in the art, such as explained in "MULTIPLE VIEW GEOMETRY IN COMPUTER VISION," by Hartley et al., Cambridge University Press (2003). Therefore, image $I_{i0}$ may be corrected to generate image $I'_{i0}$ by applying the homography $H_{Ri0\rightarrow i1}$ as indicated in Equation (9):

$$I'_{i0}=H_{Ri0\rightarrow i1}*I_{i0} \qquad (9)$$

This has the effect of transforming each 2D image point x to compensate for rotation and changes in orientation according to Equation (10):

$$x'_{i0}=H_{Ri0\rightarrow i1}*x_{i0} \qquad (10)$$

As discussed above, this simulates all motion that has been experienced by portable device 100 from time instant i0 to i1 as translation only and reduces the computational requirements of the following operations. In other words, this corrects the image for the rotation that took place between the first and second image, and only the effect on the translation on the image remains. Notably, estimating the projection matrix requires solving for three unknowns in the pure translation case as compared to six unknowns when the rotation matrix must also be estimated. By reducing the complexity of the computation, the solutions may be provided more rapidly with less power consumption. Correspondingly, these techniques may be more suitable, or even critical, for applications involving portable devices which are often subject to constraints in terms of power supply as well as processing resources.

A search for correspondence between points of interest in image $I_{i1}$ and corrected image $I'_{i0}$ may then be performed. Any suitable algorithm may be employed to identify points of interest that may be used in the point correspondence search as noted. It will be appreciated that compensation of the 3D rotations through homography also removes any perspective transformation from the images due to the rotation. As a result, the process of searching for point correspondences may be facilitated as the images will be more similar, allowing for more reliable matching. The search may also be simplified given that purely translational conditions have been simulated. Again, as mentioned above, these simplifications enable the use of such techniques in portable devices while limiting the computational and power resources.

Upon identification of one or more suitable point correspondences, Equation (11) may be derived from Equation (4) and used to solve the fundamental matrix F' with the point correspondence $x_{i0}$ and $x_{i1}$:

$$x_{i1}^T F' x'_{i0}=0 \qquad (11)$$

Equation (12) may be derived by substitution and demonstrates that Equation (13) allows the computation of the fundamental matrix F for images $I_{i0}$ and $I_{i1}$ once fundamental matrix F' has been determined:

$$x_{i1}^T F' x'_{i0}=x_{i1}^T F' H_{Ri0\rightarrow i1} x_{i0}=x_{i1}^T F x_{i0} \qquad (12)$$

$$F=F' H_{Ri0\rightarrow i1} \qquad (13)$$

In turn, epipoles $e_{i0}$ and $e_{i1}$ may be computed using Equations (14) and (15), and the projection matrix for the second image, $P_{i1}$ may be determined from Equation (16), as derived from Equation (5):

$$F e_{i0}=0 \qquad (14)$$

$$F^T e_{i1}=0 \qquad (15)$$

$$P_{i1}=[[e_{i0}]_x F|e_{i0}] \qquad (16)$$

Finally, having determined the projection matrices for images $I_{i0}$ and $I_{i1}$, the 3D position for X may be determined using Equations (17) and (18), as derived from Equation (1):

$$x_{i0}=P_{i0}X \qquad (17)$$

$$x_{i1}=P_{i1}X \qquad (18)$$

From the above, it will be appreciated that depth information may be extracted in a simplified manner for any identified points of interest corresponding between the two images. If the projection matrices $P_{i0}$ and $P_{i1}$ would have been square matrices, the projection matrices could have been inverted to determine X. However, since the projection matrices are 4×3, X can be determined by solving the equation system of Equations (17) and (18). This means that X needs to be solved using the 2×3 independent equations of Equations (17) and (18), and since there are more equations than unknowns, least squares solutions may even be applied.

Figure 4:
FIG. 4 is a graphical representation of an image for which depth information has been determined for points of interest according to an embodiment.

It may be expected that the depth information for such points of interest will be substantially accurate. However, due to the computational requirements of extracting the information as well as the practical consideration that the number of points of interests that can be identified may be limited, the result of the above operations may be termed a sparse accurate depth map. Although much of the image does not have depth information associated with it, an accurate distance to the specific points of interest may be determined. One representative example is depicted in FIG. 4, with P1, P2 and P3 indicating points of interest for which depth information has been extracted, such as through use of the techniques described above. In this example, the depth of P1 has been calculated to be 24 cm, P2 to be 68 cm and P3 to be 180 cm. Data from the camera parameters, such as e.g. focus length, aperture, depth of field, may also be combined with the depth calculations. For example, the camera focus depth can be compared with the depth calculated for the section of the image that are in focus (e.g. based on sharpness). The comparison may be used to determine a confidence in the determined depth data.

Figure 2:
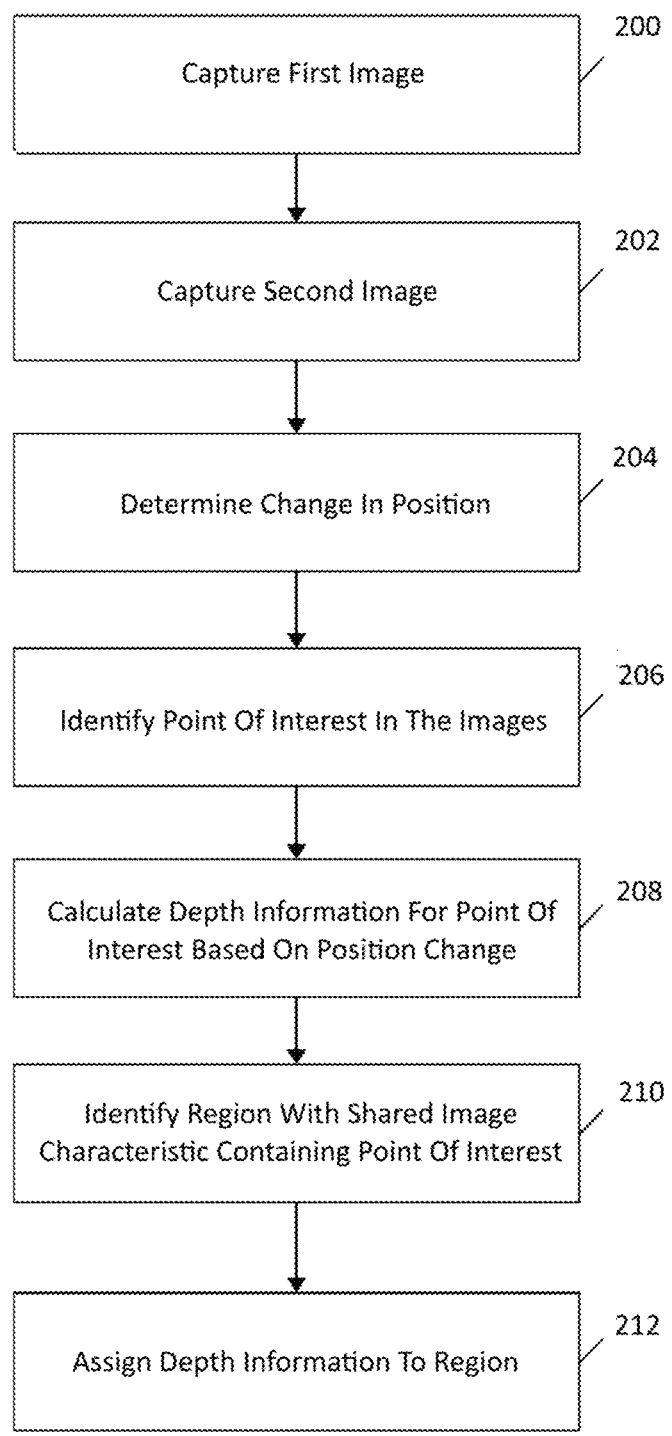
FIG. 2 is a flowchart showing a routine for providing depth information according to an embodiment.
Figure 5:
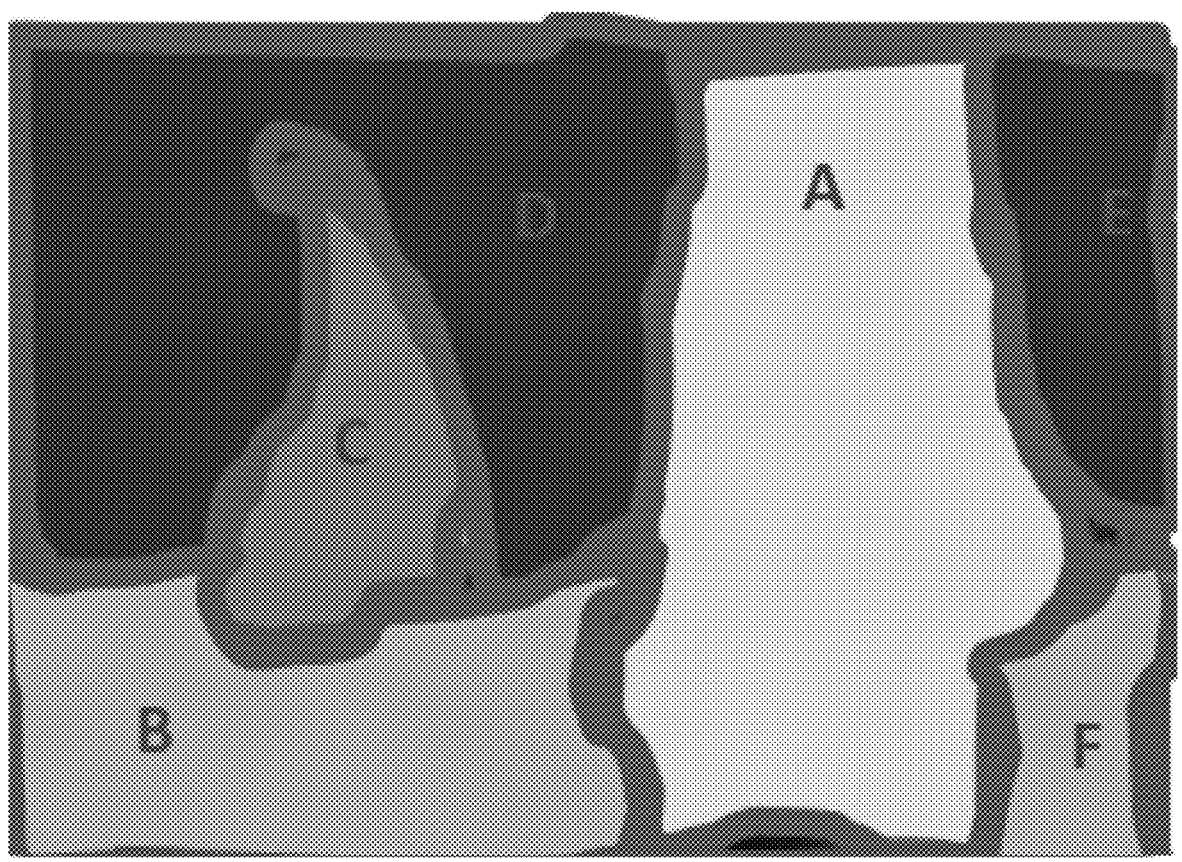
FIG. 5 is a graphical representation of the image of FIG. 4 that has been segmented by a shared image characteristic according to an embodiment.

As indicated by the discussion regarding 210 of FIG. 2, an independent processing operation may be performed on one of the images to segment regions that share an image characteristic. In one aspect, this may be a focal characteristic, such as the degree to which a given area of the image is in focus or conversely, how blurry. Techniques exist for quantifying the blurriness of a portion of an image, including phase detection and contrast detection as well as frequency analysis. As such, suitable bins may be established with corresponding thresholds to divide an image into segments of equivalent focus. Any desired level of segmentation may be achieved by appropriate definition of the bins being used. Accordingly, FIG. 5 shows the result of image segmentation as applied to the image of FIG. 4, with regions A, B, C, D, E and F each sharing equivalent degrees of focus. In other embodiments, image characteristics such as light level, contrast, color or similar attributes may be used to identify regions having a shared image characteristic. Another characteristic that may be employed is to assess the amount of relative movement of pixels within an area between successive images. Objects located the same distance from portable device 100 may be expected to exhibit equivalent amounts of relative motion. For example, objects closer to the camera may exhibit larger amount of motion due to camera movement. Movement of object may also be used to determine area of equivalent distance. In the context of image segmentation based on focus, it may be expected that some relative comparison of depth information may be made between regions, with regions having a greater degree of blur closer or farther from regions having less degree of blur. Since the entire image may be segmented, the depth map may be considered dense, but relatively inaccurate. In some embodiments, it may be desirable to identify any regions that share image characteristics and select points of interest so that at least one point of interest is within each region.

Figure 6:
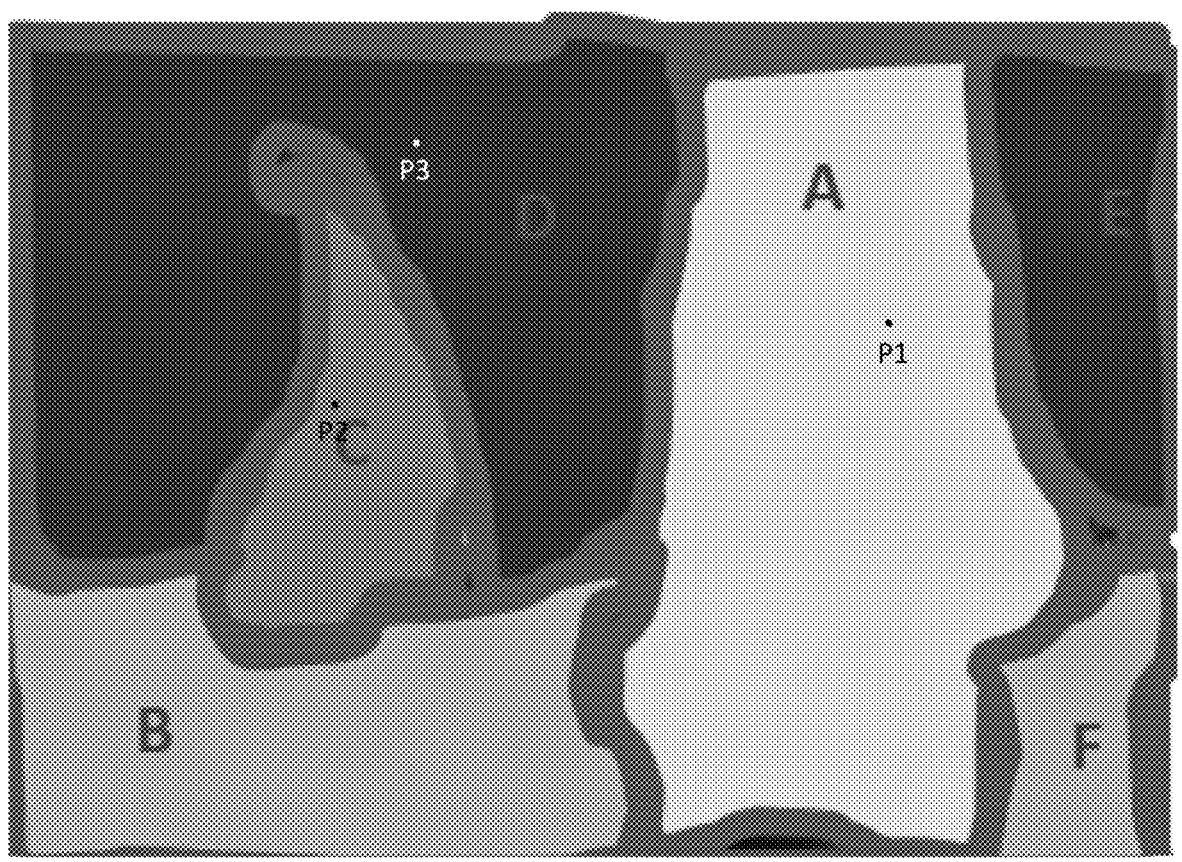
FIG. 6 is a graphical representation of an image for which depth information has assigned to regions containing points of interest according to an embodiment.

A sparse accurate depth map may be combined with a dense inaccurate depth map as represented by step 212 of FIG. 2. For example, FIG. 6 shows the superposition of FIG. 4 over FIG. 5. Since both maps correspond to the same image, they generally have the same size and may be readily aligned. When a point of interest having depth information from the sparse accurate map falls within a region of the dense inaccurate map, the depth information may be propagated to all pixels of the connected area. For example, point P1 falls within region A, so that all of this region may be assigned a depth of 24 cm. Similarly, P2 falls within region C and P3 falls within region D, so that depths of 68 cm and 180 cm may be assigned to these regions respectively. When a region contains more than one point of interest, the depth information may be averaged or weighted as desired. Alternatively, a further segmentation may be performed to generate more resolution so that a given region has only one point of interest. Further segmentation may be based on a second image characteristic, different from the first image characteristic using to determine the regions. For example, a first image characteristic may be blurriness, and a second image characteristic may be lightness, color or color intensity (or vice-versa). When several points of interest fall within one region, the correlation between the first and/or second image characteristics and the determined depth can be determined, and if this correlation is strong enough, the depth maybe interpolated or extrapolated based on the observed correlation. When a region does not contain a point of interest with known depth information from the sparse accurate map, the region may be left unassigned or a value may be determined, such as by extrapolation or interpolation. For example, the positioning and degree of blur in region B allows the determination that its depth falls between regions A and C. As such, region B may be assigned the intermediate value of 46 cm. Although this determination may be considered to be less accurate than the depth information determined through point correspondences, it still provides utility by providing an estimation. In embodiments where the shared characteristic may be quantified, a more precise estimation may be made by establishing a linear or nonlinear relationship between the characteristic and the depth information. In general, the correlation between the calculated depths of the points of interests and the image characteristics may be investigated, and if this correlation is strong enough, the depth maybe interpolated or extrapolated based on the observed correlation. This interpolation or extrapolation may be inter-region or intra-region. The correlation may be linear or non-linear, and may depend on the image characteristics. The intrinsic camera parameters, and or the camera setting used during the image acquisition may also be used to determine the relation. For example, knowing the aperture may help determine the depth-of-field, which may help determine the relation between blurriness and depth. In one embodiments, the correlation may be investigated for a plurality of candidate image characteristics, such as e.g. blurriness, light, motion, and the image characteristic with the best correlation may be used to determine the regions with shared image characteristics to construct the dense inaccurate map. The selection may be based on one or more correlation parameters and/or thresholds, which may depend on the context and/or the image context. The choice of image characteristic may also depend on the context, such as e.g. the lighting conditions or the amount of motion, of the device and/or the objects. Additional details regarding the use of context may be found in in co-pending, commonly owned U.S. patent application Ser. No. 15/231,186, filed Aug. 8, 2016, which is hereby incorporated by reference in its entirety.

The techniques explained above rely on a correct determination of the rotation matrix or equivalent. The rotation information should also be available with a certain accuracy/confidence. If the accuracy or confidence is too low, the homography to correct for the rotation may not be determined correctly, making the techniques inaccurate or unreliable. Therefore, an accuracy or confidence threshold may be applied, and the sparse accurate map may only be determined if the confidence is above this threshold. In one embodiment, the first image and second image may be selected from a plurality or series of images, in order to obtain the most accurate reliable corresponding rotation matrix. For example, the first image may be selected at a first moment of low motion, and the second image may be selected at a second moment of low motion, wherein a substantial rotational motion takes place between the first and second moments of low motion. The orientation of the mobile device may be determined using gyroscope and accelerometer and/or magnetometer fusion, and the rotational motion may be determined based on the gyroscope only, or also using fusion techniques. Even though the sparse accurate map is only determined using selective images, the resulting depth information may still be combined with the dense inaccurate map in the (intermediate) images. As such, the sparse accurate map may be determined at specific moments when motion or other conditions permit, but the combination of the sparse accurate map and the dense inaccurate map may be applied for all images. The sparse accurate map for the intermediate images may be determined, for example through interpolation. When the same points of interest are used for the different sparse accurate maps, the interpolation is simplified. If this is not the case, the image characteristics may assist in the interpolation. A confidence threshold may be applied where the combination of the two maps is only performed when the interpolation can be determined with a certain confidence, since in situations of incorrect depth map may be more problematic than an absent depth map.

Although the depth information determined using the techniques of this disclosure may be employed for any suitable purpose, one exemplary application is in the field of image stabilization. Notably, one image stabilization technique may involve processing operations known in the art as electronic image stabilization (EIS), where the image sensor captures/records images without any prior (optical) stabilization. Electronic Image Stabilization is sometimes also referred to as Digital Image Stabilization (DIS) because it only involves digital image processing techniques. As known in the art, this is an image processing technique where, for example, at least two captured images are employed with one serving as a reference. By comparing the second image, it may be determined whether one or more pixels have been translated or "shifted." To the extent such translation is due to unintended motion of device 100, the second image may be adjusted to generate a stabilized image that minimizes the amount the one or more pixels are shifted, since in the absence of intended movement of the camera and movement of objects in the scene, the pixels should be identical (neglecting camera sensor noise). In one aspect, motion of device 100 may be detected by a suitable sensor assembly, such as SPU 118, while an image is being captured. Accordingly, the characteristics of that motion may be used to adjust the captured image by shifting the pixels by an amount that compensates for the detected motion to generate a stabilized image. These techniques may be referred to as gyroscope assisted image stabilization, or gyroscope assisted EIS, since gyroscope sensors are often used to measure the motion. As desired, one or any combination of these and other techniques may be used to stabilize images.

In EIS, there are two general principles that are applied to stabilize images or video depending on the relative position of the image being stabilized. Typically, scenes that are relatively farther away, or may be considered background, may be stabilized by compensating for 3D camera rotation only. In the proper context, this principle provides satisfactory results, such as by minimizing geometric distortions. In contrast, scenes that are relatively close, or in the foreground, may require compensation for both rotational and translational motion. Conventionally, the translational motion may be estimated from pixel displacement in an object positioned near the center of the image. The EIS system may then compute a correction function that is applied to the full image. However, when an image contains both close and distant objects, the translational compensation determined for the close objects may cause geometric distortions when applied to the distant objects or the background. One illustration of this effect is that distant straight edges may appear with variable geometric distortions, such as a building with wobbling walls, which is perceived ad very disturbing to the user. By employing the techniques of this disclosure, compensation functions may be computed for any one or set of segmentation regions, based on the established depth information. For example, one or more regions may be categorized as foreground and/or one or more regions may be categorized as background. As such, corrections may be separately applied to one or more of the regions and the results combined following stabilization to produce images that have reduced geometric distortion. The different regions may be classified, and a different set of image stabilization parameters may be applied to each region depending on the class. In case only a single stabilization technique, or set of stabilization parameters, may be applied to the entire image, the selection of this technique or the parameters may be done based on the dominant class.

The techniques of this disclosure may also be used in conjunction with an optical image stabilization (OIS) system, where the lens is moved by actuators in order to compensate for the sensed motion. Notably, OIS typically corrects for rotational motion only, providing a hardware-based method for removing or compensating for change in position that is analogous to the homography described above. Correspondingly, output of the OIS simulates a pure translation case, similar to the culmination of Equations (9) and (10). As such, when OIS data is available, the search for correspondence between points of interest in image $I_{i1}$ and corrected image $I'_{i0}$ may be performed directly. In other words, when OIS is used, the rotation correction may be determined using the OIS system and when OIS is not used, the rotation correction may be determined through homography. Notably, OIS is typically applied for relatively small changes in orientation, such as may result from hand shake or the like. For relatively larger changes in orientation, it may be desirable to use the homography techniques to determine the rotation correction even when OIS is available. Therefore, a motion threshold may be used to determine when the rotation is removed by the techniques discussed above, or by the OIS. This means that based on the data from the motion sensors, and comparison of this data to the motion threshold, the system will decide which techniques to use. In some embodiments, the OIS may not remove the rotation in all 3 degrees of rotational freedom, such as e.g. rotation around the lens axis, and so a combination of the techniques may be used for the different rotational degrees of freedom. Further, the OIS system may be selectively enabled to compare the results obtained using both techniques. When OIS is on, the gyroscope data may be used to control the OIS actuators and this information may provide indication of the change in position of portable device 100. Conversely, when OIS is off, the techniques described with regard to Equations (9) and (10) may be used when determining R and H. Comparison of both options may be used as a test to determine the accuracy and quality of the proposed solution when OIS cannot be used. Using this comparison, the system may be optimized by adjusting the parameters of the calculations.

Another key point of the disclosure is the combination of a sparse metric depth map and a dense depth map with unreliable metric information. Together the method provides a dense metric depth map implementable on a phone.

As discussed above, this disclosure includes a method for processing an image captured using a portable device to extract depth information. The method may involve capturing a first image with the portable device at a first time, capturing a second image with the portable device at a second time, determining a change in position of the portable device from sensor data from the first time to the second time, identifying a point of interest appearing in both the first image and the second image, calculating depth information for the point of interest by evaluating positions of the point of interest within the first image and the second image with the determined change in position of the portable device, defining a first region of one of the images having a shared image characteristic, wherein the point of interest is within the first region, and assigning depth information derived from the depth information calculated for the point of interest to points within the first region.

In one aspect, the shared image characteristic may be a focal characteristic, a contrast characteristic, a lightness characteristic, a color characteristic or a motion characteristic.

In one aspect, a plurality of points of interest may be identified in the first image and the second image and depth information may be calculated for each point of interest. The plurality of points of interest may be within the first region. The depth information assigned to the first region may be derived by combing the depth information calculated for the plurality of points of interest.

In one aspect, a plurality of regions of one of the images may be defined, wherein each region has a shared image characteristic and depth information may be assigned to each region that is derived from the depth information calculated for a point of interest within each region. A second region of one of the images having a shared image characteristic may be defined that does not contain one of the plurality of points of interest and depth information may be assigned to the second region based at least in part on assigned depth information of a region that does contain a point of interest. The assignment of depth information to the second region may be based at least in part on establishing a relationship between the shared image characteristic and the assigned depth information of at least one region containing a point of interest. The shared image characteristic may be quantified such that assigning depth information to the second region may be based at least in part on the quantification. The points of interest may be determined based on the plurality of regions with shared image characteristics In one aspect, the motion sensor data may be gyroscope data. Evaluating positions of the point of interest within the first image and the second image with the determined change in position of the portable device may involve applying a homography correction for the first image using a rotation of the portable device determined from the gyroscope data. The homography correction may simulate the change in position as being purely translational. Projection matrices for the first and second images may be derived, such that calculating depth information for the point of interest involves determining spatial coordinates for the point of interest using the projection matrices.

In one aspect, an electronic image stabilization technique may be applied to the first region based at least in part on the assigned depth information. A plurality of regions may be defined and at least one different stabilization technique may be applied to another region. At least one of the regions may be categorized, such that applying an electronic image stabilization technique may be based at least in part on the categorization. At least one of the regions may be categorized as foreground and at least another of the regions may be categorized as background, so that the method involves selectively applying a first electronic image stabilization technique to the foreground and selectively applying a second electronic image stabilization technique to the background. The first electronic image stabilization technique may compensate for rotational and translational movement of the portable device and the second electronic image stabilization technique may compensate for only rotational movement of the portable device.

In one aspect, an optical image stabilization technique may be applied when capturing the second image. Determining the change in position may be based at least in part on a rotational correction from the optical image stabilization technique.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for determining depth information for an image recorded with a portable device comprising:
    capturing a first image with the portable device at a first time;
    capturing a second image with the portable device at a second time;
    determining a change in position of the portable device from motion sensor data comprising gyroscope data from the first time to the second time;
    identifying a point of interest appearing in both the first image and the second image;
    determining a projection matrix for the first image and a projection matrix for the second image;
    calculating depth information for the point of interest by evaluating positions of the point of interest within the first image and the second image with the determined change in position of the portable device, by applying a homography correction for the first image using a rotation of the portable device determined from the gyroscope data and by determining spatial coordinates for the point of interest using the projection matrices;
    defining a first region of one of the first and second images having a shared image characteristic, wherein the shared image characteristic is at least one of a focal characteristic, a contrast characteristic, a lightness characteristic and a color characteristic, and wherein the point of interest is within the first region; and
    assigning depth information derived from the depth information calculated for the point of interest to points within the first region.

2. The method of claim 1, wherein the homography correction simulates the change in position as being purely translational.

3. A portable device comprising: a camera unit; a sensor configured to output data representing motion of the portable device comprising gyroscope data; and a depth module configured to:
  identify a point of interest appearing in both a first image captured with the camera unit at a first time and a second image captured with the camera unit at a second time;
  determine a projection matrix for the first image and a projection matrix for the second image;
  calculate depth information for the point of interest by evaluating positions of the point of interest within the first image and the second image with a change in position of the portable device from the first time to the second time determined from data of the sensor, by applying a homography correction for the first image using a rotation of the portable device determined from the gyroscope data and by determining spatial coordinates for the point of interest using the projection matrices;
  define a first region of one of the first and second images having a shared image characteristic, wherein the shared image characteristic is at least one of a focal characteristic, a contrast characteristic, a lightness characteristic and a color characteristic, and wherein the point of interest is within the first region; and
  assign depth information derived from the depth information calculated for the point of interest to points within the first region.

4. An image processing unit comprising a processor configured to: receive a first image captured by a camera at a first time; receive a second image captured by the camera at a second time; obtain motion sensor data representing motion of the camera comprising gyroscope data; and implement a depth module to:
  identify a point of interest appearing in both the first image and the second image;
  determine a projection matrix for the first image and a projection matrix for the second image;
  calculate depth information for the point of interest by evaluating positions of the point of interest within the first image and the second image with a change in position of the camera from the first time to the second time determined from the obtained motion sensor data, by applying a homography correction for the first image using a rotation of the portable device determined from the gyroscope data and by determining spatial coordinates for the point of interest using the projection matrices;
  define a first region of one of the first and second images having a shared image characteristic, wherein the shared image characteristic is at least one of a focal characteristic, a contrast characteristic, a lightness characteristic and a color characteristic, and wherein the point of interest is within the first region; and
  assign depth information derived from the depth information calculated for the point of interest to points within the first region.

* * * * *